(12) United States Patent
Comendant

(10) Patent No.: US 7,651,269 B2
(45) Date of Patent: Jan. 26, 2010

(54) TEMPERATURE PROBES HAVING A THERMALLY ISOLATED TIP

(75) Inventor: Keith Comendant, Alameda, CA (US)

(73) Assignee: Lam Research Corporation, Fremont, CA (US)

( * ) Notice: Subject to any disclaimer, the term of this patent is extended or adjusted under 35 U.S.C. 154(b) by 367 days.

(21) Appl. No.: 11/826,941

(22) Filed: Jul. 19, 2007

(65) Prior Publication Data

US 2009/0022205 A1 Jan. 22, 2009

(51) Int. Cl.
- G01K 1/00 (2006.01)
- G01K 11/20 (2006.01)
- G01K 7/00 (2006.01)
- G01K 13/00 (2006.01)

(52) U.S. Cl. .................. 374/208; 374/161; 374/163; 374/141

(58) Field of Classification Search .......... 374/208, 374/161
See application file for complete search history.

(56) References Cited

U.S. PATENT DOCUMENTS

| | | | |
|---|---|---|---|
| 4,626,110 A | 12/1986 | Wickersheim et al. | |
| 4,752,141 A | 6/1988 | Sun et al. | |
| 5,176,451 A | 1/1993 | Sasada et al. | |
| 5,556,204 A * | 9/1996 | Tamura et al. | 374/161 |
| 5,618,109 A | 4/1997 | Culbertson | |
| 5,791,782 A | 8/1998 | Wooten et al. | |
| 5,876,119 A | 3/1999 | Ishikawa et al. | |
| 5,893,643 A * | 4/1999 | Kumar et al. | 374/131 |
| 6,084,215 A * | 7/2000 | Furuya et al. | 219/444.1 |
| 6,110,288 A | 8/2000 | Penelon et al. | |
| 6,226,453 B1 | 5/2001 | Yam et al. | |
| 6,257,758 B1 | 7/2001 | Culbertson | |
| 6,332,709 B1 | 12/2001 | Burke et al. | |
| 6,481,886 B1 | 11/2002 | Narendrnath et al. | |
| 6,572,265 B1 | 6/2003 | Gotthold et al. | |
| 6,575,622 B2 | 6/2003 | Norrbakhsh et al. | |
| 6,796,711 B2 | 9/2004 | Colson et al. | |
| 6,799,137 B2 | 9/2004 | Schietinger | |
| 7,018,096 B2 | 3/2006 | Benjamin | |
| 7,080,940 B2 | 7/2006 | Gotthold et al. | |
| 7,080,941 B1 | 7/2006 | Benjamin et al. | |
| 2004/0208228 A1* | 10/2004 | Hashikura et al. | 374/179 |
| 2006/0056488 A1* | 3/2006 | Surname et al. | 374/184 |
| 2007/0086503 A1* | 4/2007 | Fujii | 374/1 |

OTHER PUBLICATIONS

International Search Report and Written Opinion mailed Nov. 18, 2008 for PCT/US2008/008562.

* cited by examiner

*Primary Examiner*—Gail Verbitsky
*Assistant Examiner*—Mirellys Jagan
(74) *Attorney, Agent, or Firm*—Buchanan Ingersoll & Rooney PC

(57) ABSTRACT

Temperature probes for measuring the temperature of objects are disclosed. The temperature probes include a housing and a tip in thermal contact with an end of the housing. The tip is adapted to contact a surface of the object whose temperature is to be measured by the temperature probe. A portion of the housing in contact with the tip has a high thermal resistance effective to thermally isolate the tip from an adjacent portion of the housing. A sensor is located inside of the housing and adapted to measure the temperature of the tip.

20 Claims, 6 Drawing Sheets

TEMPERATURE PROBES HAVING A THERMALLY ISOLATED TIP

BACKGROUND

In the field of semiconductor material processing, for example, semiconductor material processing apparatuses including vacuum processing chambers are used for performing various processes, such as etching and deposition of various materials on substrates, and resist stripping. Because the effectiveness of such processes is often dependent on controlling the temperature conditions at certain locations of the processing chambers, temperature sensors have been used in the processing chambers to measure temperature.

SUMMARY

Temperature probes for measuring the temperature of objects are disclosed. An exemplary embodiment of the temperature probes comprises a housing comprising first and second portions comprised of the same material, and a bore including a first section extending through the first portion and a second section extending through the second portion, the second portion of the housing comprising a first end adjacent the first portion, a second end, a wall including an outer surface and an inner surface defining the second section, and at least one opening extending through the wall; a tip mounted to the second end of the second portion, with the tip adapted to contact a surface of the object whose temperature is to be measured; and a sensor located in the bore and adapted to measure a temperature of the tip; wherein the second portion has a thermal resistance effective to thermally isolate the tip from the first portion.

Another exemplary embodiment of the temperature probes is provided, which comprises a housing comprising a first portion, a second portion, and a bore including a first section extending through the first portion and a second section extending through the second portion, the entire housing being comprised of the same material, the first section of the bore having a larger diameter than the second section, the second portion of the housing comprising a first end adjacent the first portion, a second end, a wall including an outer surface and an inner surface defining the second section, and at least one opening extending through the wall and configured such that heat is conducted between the first and second ends of the second portion in a turning pattern having a length exceeding the length of the second portion; a tip mounted to the second end of the second portion, the tip adapted to contact a surface of the object whose temperature is to be measured; and a sensor located in the bore and adapted to measure a temperature of the tip; wherein the second portion (i) has a thermal resistance effective to thermally isolate the tip from the first portion and (ii) resiliently biases the tip.

Another exemplary embodiment of the temperature probes is provided, which comprises a one-piece housing comprising first and second portions and a longitudinal bore extending through the first portion and the second portion, the second portion of the housing comprising a first end adjacent the first portion, a second end, a wall including an outer surface and an inner surface defining a portion of the longitudinal bore, and at least one opening extending through the wall and configured such that heat is conducted between the first and second ends of the second portion in a turning pattern having a length exceeding the length of the second portion; a tip mounted to the second end of the second portion, with the tip adapted to contact a surface of the object whose temperature is to be measured, wherein the second portion is effective to resiliently bias the tip against the surface; and a sensor located in the bore and adapted to measure a temperature of the tip.

DRAWINGS

DETAILED DESCRIPTION

Temperature probes for measuring the temperature of objects are disclosed. The temperature probes include a thermally-isolated tip adapted to be positioned in thermal contact with a surface of an object whose temperature is to be measured. Embodiments of the temperature probes are adapted to be used in various applications to measure the temperature of objects.

Embodiments of the temperature probes can be used, for example, in plasma processing chambers for measuring the temperature of chamber components or semiconductor substrates during plasma processing operations. The plasma processing chambers can be capacitively-coupled chambers, inductively-coupled chambers, and resist stripping chambers in which various processing operations including etching, deposition and resist stripping are performed.

Figure 1:
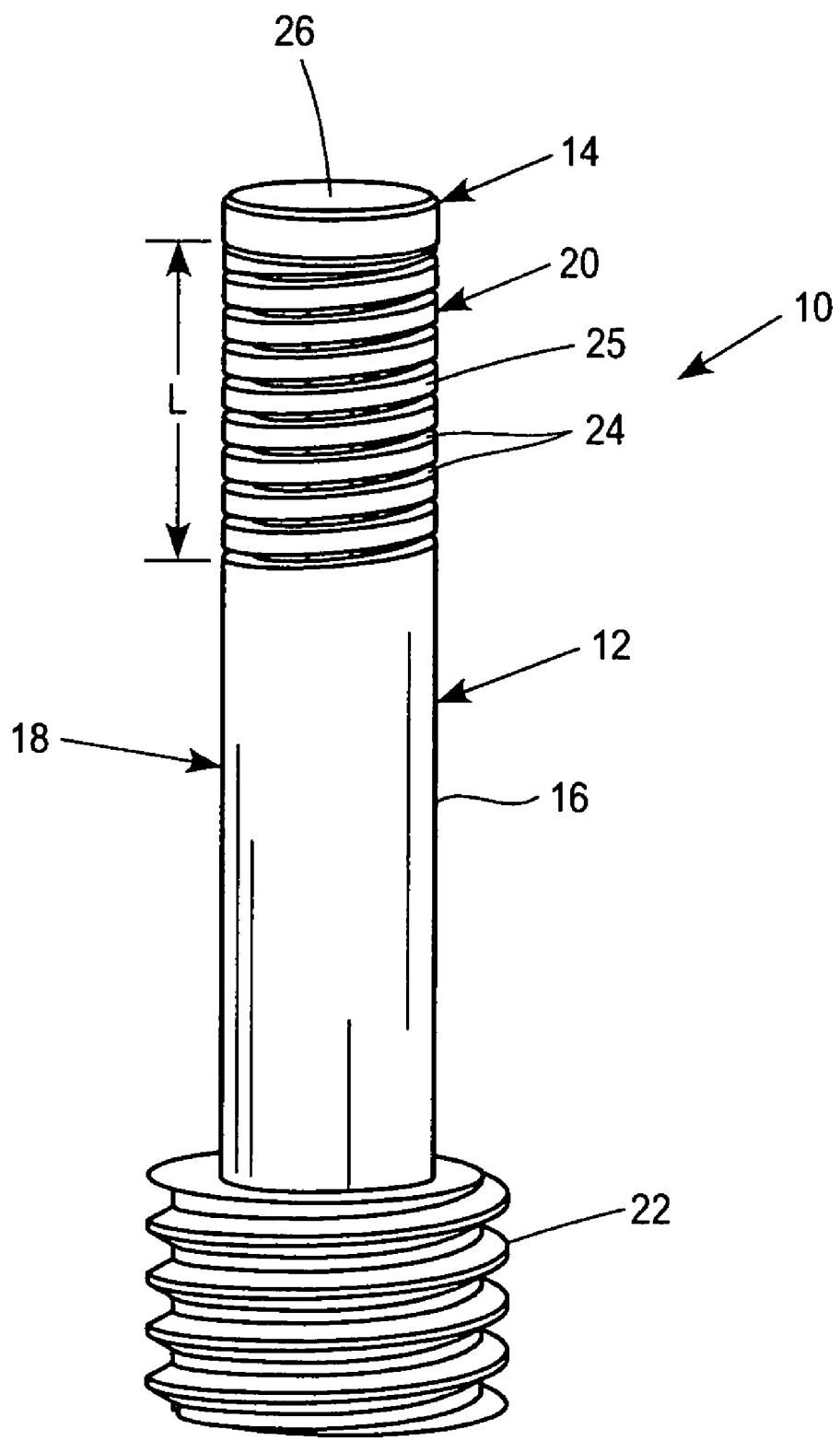
FIG. 1 illustrates an exemplary embodiment of a temperature probe.

FIG. 1 depicts a temperature probe 10 according to an exemplary embodiment. As shown, the temperature probe 10 includes a housing 12 and a separate tip 14 provided on an upper end of the housing 12. As described below, the housing 12 and tip 14 are typically made of different materials. The housing 12 includes an outer surface 16 and an inner surface (not shown), the latter of which defines an internal longitudinal bore extending through the housing 12. The housing 12 includes a first portion 18 and an adjacent second portion 20. In this embodiment, the entire housing 12 is made of one piece of a material. In other words, in this embodiment, the first portion 18 and second portion 20 are comprised of the same material. As shown, the first portion 18 includes external threads 22 at the base of the first portion 18. The threads 22 are adapted to engage mating internal threads of a body in order to secure the temperature probe 10 to the body. In the illustrated embodiment, the portion of the housing 12 above the threads 22 has a cylindrical shape. The base of the first portion 18 including the threads 22 has a greater outer diameter than the remainder of the first portion 18 and the second portion 20.

The tip 14 of the temperature probe 10 is configured to be placed in contact with a surface of an object whose temperature is to be measured with the temperature probe 10. The second portion 20 of the housing 12 is constructed to thermally isolate the tip 14 from the first portion 18 of the housing, i.e., to reduce, and preferably minimize, heat transfer by conduction from the tip 14 to the first portion 18, and vice versa, during contact between the tip 14 and the object. By reducing the rate of heat transfer between the tip 14 and the first portion 18 of the housing 12, a greater amount of the heat that enters the tip 14 from the object remains in and heats the tip 14. Less of the heat is transferred from the tip 14 to the housing 12 and the surrounding environment. Consequently, the tip 14 reaches a temperature closer to, or equal to, the temperature of an object whose temperature is being measured. At a steady state condition, the tip 14 remains at the same temperature as the object. Accordingly, the temperature probe 10 is able to provide accurate measurements of the temperature of the object.

For one-dimensional, steady-state heat transfer conditions, the heat transfer rate, q, across a material is given by Equation 1: $q=kA(T_1-T_2)/L$, where k is the thermal conductivity of the material, A is the cross-sectional area of the material in the direction perpendicular to the direction of heat transfer, $T_1$ is the temperature at one face of the material and $T_2$ is the temperature at an opposite face of the material ($\Delta T=T_1-T_2$, where $\Delta T$ can be positive or negative), and L is the length of the material along which the heat transfer occurs. Equation 1 can be rearranged as Equation 2: $q=\Delta T/(L/kA)$. In Equation 2, the term L/kA is referred to as the "thermal resistance" of the material. According to Equation 2, at a given value of $\Delta T$, increasing the thermal resistance of the material decreases the heat transfer rate, q, along the length of the material that heat transfer occurs. The thermal resistance can be increased by increasing L, decreasing k and/or decreasing A. The housing 12 of the temperature probe 10 is constructed to provide high thermal resistance in the second portion 20 to reduce heat conduction between the tip 14 and the first portion 18. The high thermal resistance of the second portion 20 preferably allows the tip 14 to reach a temperature that is equal to the temperature of the surface of the object in contact with the tip 14.

The housing 12 can comprise any suitable material having the desired properties. The material of the housing 12 preferably has a low coefficient of thermal conductivity, k, to reduce the rate of heat transfer, q, by conduction along the second portion 20 of the housing 12. Accordingly, the material of the housing 12 can be selected to enhance the thermal isolation of the tip 14 from the first portion 18 of the housing 12, which enhances the accuracy of temperature readings of the object that can be made by the temperature probe 10.

To allow exposure of the temperature probe 10 to relatively higher temperature conditions, the housing 12 can be made of a suitable polymeric material, such as polytetrafluoroethylene (PTFE), polyetheretherketones (PEEK), polyimide, polyamide-imide (PAI), polyetherimide (for example, ULTEM 1000) and the like. For relatively lower temperature applications of the temperature probe 10, other plastic materials, such as acetals and acrylics, can be used to construct the housing 12.

In other embodiments of the temperature probe, the housing 12 can be made of a metallic material. Metallic materials can be used over a broader service temperature range than plastics. The metallic materials used to construct the housing 12 preferably have a low thermal conductivity for metals. For example, embodiments of the housing 12 can be made of stainless steels (for example, 304 or 430 stainless steels), nickel-based alloys (for example, INCONEL, NICHROME or the like), or titanium. Although these metallic materials may have a significantly higher thermal conductivity than polymers, such as plastics, used to construct the housing 12, these metallic materials offer higher stiffness and strength than the plastics. These mechanical properties allow the metallic materials to have a smaller cross-sectional area, A, than plastics and still have suitable mechanical properties in the housing 12. Consequently, the metallic materials can be fabricated to have a sufficiently-small cross-sectional area in one or more selected regions of the housing 12, including the second portion 20 of the housing 12, to reduce thermal conduction through the metallic materials in these regions to a suitable level for use in the temperature probe 10.

In other exemplary embodiments of the temperature probe 10, at least a portion of the housing 12 (e.g., the entire first portion 18 and/or second portion 20) can be made of a suitable composite material, preferably one having low thermal conductivity.

In some exemplary embodiments of the temperature probe 10, the first portion 18 and second portion 20 of the housing 12 can be separate pieces of material. For example, the first portion 18 and second portion 20 can both be comprised of the same polymeric, metal or composite material. The first portion 18 and second portion 20 can alternatively be comprised of different materials from each other. In such embodiments, a top end of the first portion 18 and a bottom end of the second portion 20 can be bonded to each other with a bonding material having low thermal conductivity, to further decrease the rate of heat conduction from the second portion 20 to the first portion 18, and vice versa.

The second portion 20 of the housing 12 includes at least one opening that extends through the wall of the housing 12. In the embodiment, the first portion 18 does not include such opening(s). The opening(s) in the second portion 20 enhance(s) the thermal resistance of the second portion 20. The opening(s) can have any suitable size, shape and pattern that provide(s) the desired amount of thermal isolation to the tip 12. For example, in the embodiment shown in FIG. 1, the second portion 20 has a coil configuration and includes a single opening 24 having a continuous spiral shape. The spiral can be a single or multiple helix configuration. Sections of the opening 24 are adjacent solid material 25. The second portion 20 can include more than one spiral-shaped opening.

Figure 2:
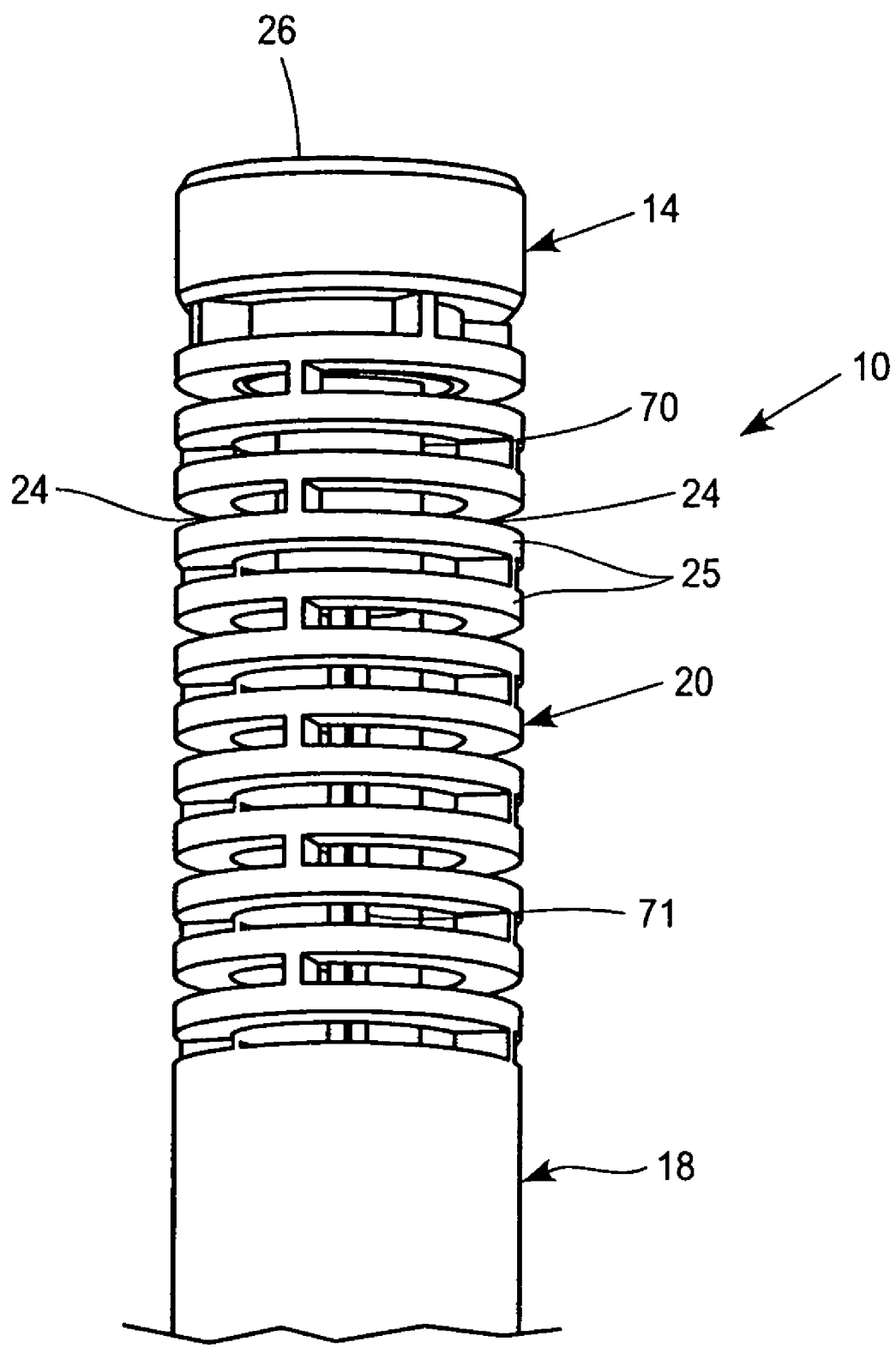
FIG. 2 illustrates a portion of another exemplary embodiment of a temperature probe.

FIG. 2 depicts another exemplary embodiment of the temperature probe 10. In this embodiment, a plurality of separate openings 24 are disposed in an alternating pattern along the length of the second portion 20 of the housing. In this embodiment, two openings 24 are disposed between adjacent portions of solid material 25. The two openings 24 each extend close to 180°. As described below, a sensor 70 with wiring 71 is shown disposed inside of the second portion 20. A tip 14 is mounted to the second portion 20.

Figure 3:
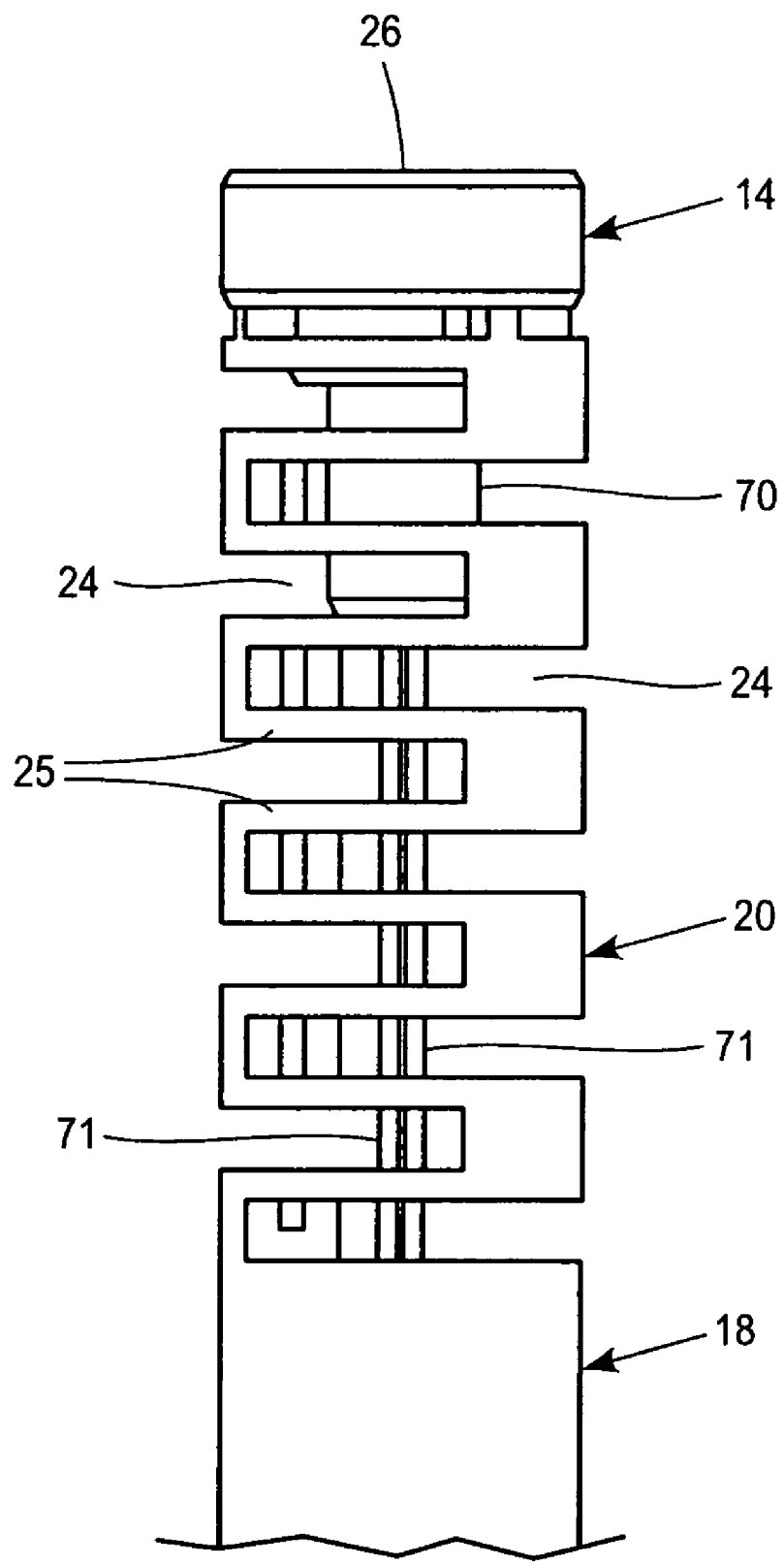
FIG. 3 illustrates a portion of another exemplary embodiment of a temperature probe.

FIG. 3 depicts another exemplary embodiment of the temperature probe 10. In this embodiment, a plurality of separate openings 24 are formed in an alternating pattern in the second portion 20 of the housing. A sensor 70 with wiring 71 is shown disposed inside of the second portion 20. A tip 14 is mounted to the second portion 20.

In the exemplary embodiments of the temperature probe 10 shown in FIGS. 1-3, the openings 24 in the second portion 20 can typically have a width of about 0.1 mm to about 0.5 mm in the uncompressed state. The material 25 of the housing 12 between adjacent portions of the openings 24 (FIG. 1) or defining separate openings 24 (FIGS. 2 and 3) can typically have a width of about 0.3 mm to about 2.5 mm. The second portion 20 including the opening(s) 24 can typically have a length, l, of about 5 mm to about 15 mm (see FIG. 1).

The temperature probe 10 is typically exposed to an ambient environment during use. In the ambient environment, the one or more openings 24 form one or more corresponding air gaps in the second portion 20 of the housing 12. The air gaps typically have a low thermal conductivity of about 0.025 W/m·K, which is substantially lower (for example, at least ten times lower) than the thermal conductivity of most plastics, and lower yet than the thermal conductivity of metallic materials used to form the housing 12. The air gaps are effective to increase the thermal resistance of the second portion 20 and thereby decrease heat conduction from the tip 14 to the first portion 18 of the housing 12.

Additionally, by forming the openings 24 in the second portion 20 of the housing 12 in a spiral configuration with one opening (FIG. 1), or in another suitable configuration including multiple openings (such as shown in FIGS. 2 and 3), heat has only one main conduction path in the temperature probe 10 from the tip 14. For example, in the temperature probe 10 shown in FIG. 1, the heat is forced to flow in the spiral pattern and circle around the second portion 20 through the housing material 25 defining the opening 24, until the heat has flowed along the entire length of the second portion 20 and reached the first portion 18 of the housing 12. Thus, forming the spiral-shaped opening 24 in the second portion 20 significantly increases the actual length, L, of the heat conduction path through the second portion 20 between the tip 14 and the first portion 18 of the housing 12, as compared to the length, l, of the second portion 20. The number of turns of the spiral opening can be increased to increase L. For example, the spiral can include five to twenty turns. Increasing the length of the heat conduction path increases the magnitude of the thermal resistance of the second portion 20 (Equation 2), which further decreases the rate of heat transfer, q, along the second portion 20 and increases the degree of thermal isolation of the tip 14 from the first portion 18. In addition, increasing the number of turns, can reduce the amount of individual opening width reduction when the tip 14 is compressed, on a per turn basis.

In the temperature probes 10 shown in FIGS. 2 and 3, heat is forced to be conducted in a turning pattern about the longitudinal axis of the temperature probe 10 as the heat flows through the housing material 25 defining the openings 24. Consequently, the heat must flow a longer distance in going from the upper end to the lower end of the second portion 20, or vice versa, than the length, l, of the second portion 20, which further increases the degree of thermal isolation of the tip 14 from the first portion 18.

As described above, reducing the wall thickness of the second portion 20 of the housing 12 also increases the thermal resistance of the second portion 20. Accordingly, it is desirable to minimize the wall thickness of the second portion 20. The wall thickness of the second portion 20 can typically range from about 0.5 mm to about 2 mm. The first portion 18 of the housing 12 supports the second portion 20 and the tip 14. The wall thickness of the first portion 18 is typically greater than the wall thickness of the second portion 20 to provide the desired strength and stiffness to the housing 12. For example, the wall thickness of the entire first portion 18 (or in the portion of the first portion 18 above the threads 22 in embodiments that include threads, such as shown in FIG. 1) can typically range from about 1 mm to about 5 mm. As described above, metallic materials can be used to construct the housing 12 with a smaller wall thickness at both the first portion 18 and second portion 20, as compared to plastic materials used to construct the housing 12, and still provide suitable structural properties.

In embodiments, such as those shown in FIGS. 1-3, the second portion 20 of the housing 12 is preferably sufficiently resilient to allow the tip 14 to move somewhat independently of the housing 12, to thereby resiliently bias the top surface 26 of the tip 14 against a surface of an object, whose temperature is to be measured by the temperature probe 10, in a self-aligning manner. In the embodiments shown in FIGS. 1-3, the top surface 26 of the tip 14 is flat. However, the top surface 26 can have different contours, such as semi-circular, that match the contour of the surface of the object that the top surface 26 contacts with. The enhanced resiliency of the second portion 20 is produced by the opening(s) 24. In addition, the material used to construct the housing 12 can be selected to increase the resiliency of the second portion 20. For example, resilient plastic materials can be used to make the housing 12. Thin metals can also provide resiliency.

The one-piece housing 12 comprised of the same material can be made by various manufacturing techniques. For example, the housing 12 can be made by molding. The threads 40 on the first portion 18 of the housing 12 can be formed by the molding process, or after the molding process. In another embodiment, the housing 12 can be made by machining a single piece of plastic or metal, such as a piece of tubing. The openings 24 can be formed in the second portion 20 of the housing 12 by laser ablation, high-pressure water jet machining, or conventional machining techniques, for example. Housings including more than one piece (e.g., separate first and second portions) can also be made by these techniques.

Figure 4:
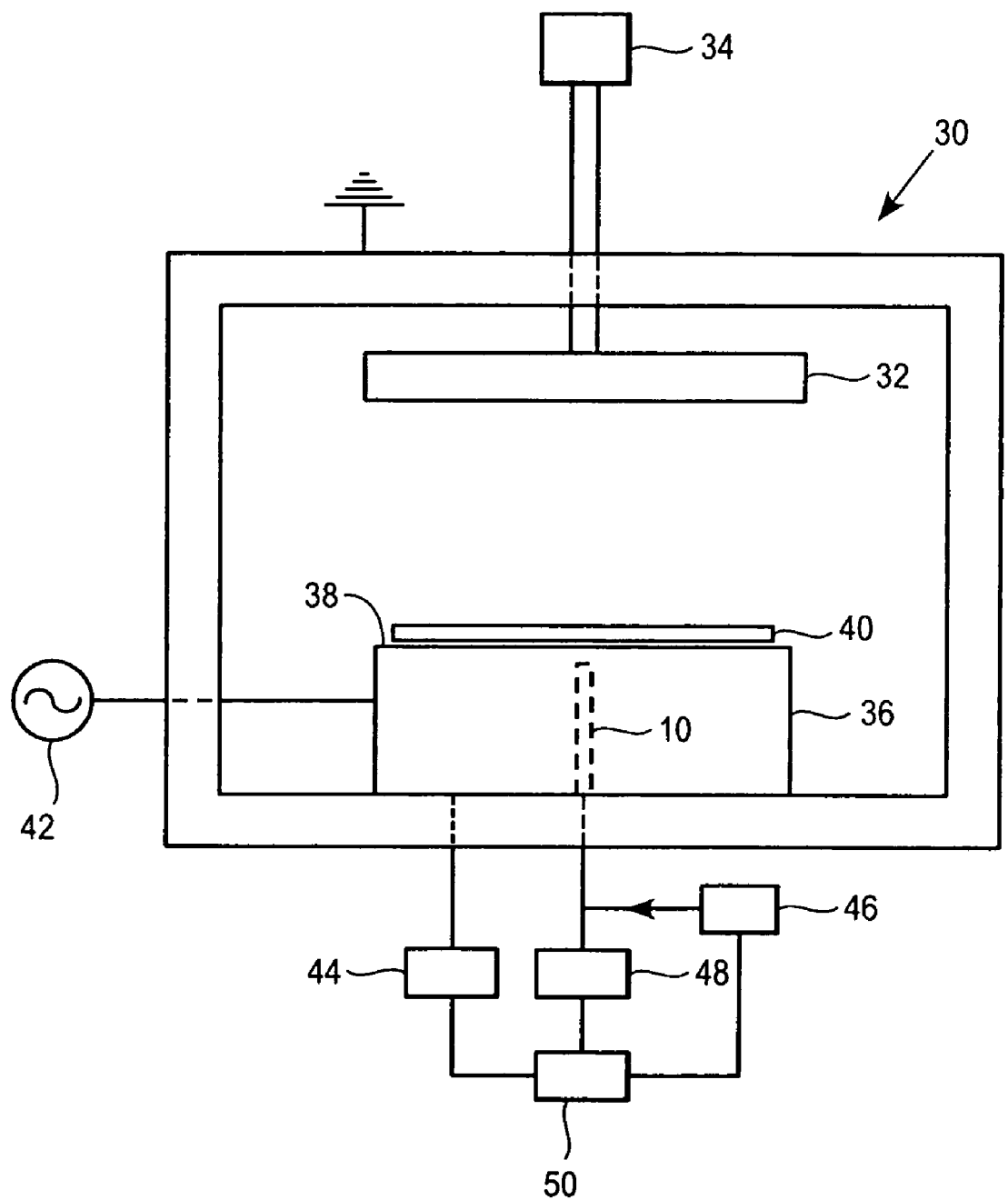
FIG. 4 illustrates an exemplary embodiment of a plasma processing chamber of a semiconductor material plasma processing apparatus.

As described above, embodiments of the temperature probe 10 can be used for measuring the temperature of semiconductor substrates in plasma processing chambers. FIG. 4 depicts an exemplary embodiment of a capacitively-coupled plasma processing chamber 30 of a plasma processing apparatus for processing semiconductor material substrates, such as semiconductor wafers, in which one or more of the temperature probes can be installed to measure the temperature of one or more objects, such as a semiconductor substrate and a chamber component (for example, an upper electrode). As shown, the plasma processing chamber 30 includes an upper electrode assembly 32, such as a showerhead electrode assembly including a showerhead with gas injection openings. The upper electrode assembly 32 is in fluid communication with a process gas source 34. The upper electrode assembly 32 is adapted to supply the process gas into the plasma processing chamber 30 via the gas injection openings. A substrate support 36 is shown positioned below the upper electrode assembly 32. The substrate support 36 includes an upper surface 38 on which a semiconductor substrate 40 is supported. The substrate 40 faces the upper electrode assembly 32. The substrate support 36 typically includes an electrostatic chuck (ESC) adapted to electrostatically clamp the substrate 40 on the upper surface 38. Radio-frequency (RF) power can be supplied to the substrate support 36 by at least one RF power source 42 (with each RF power source adapted to supply power to the substrate support 36 at a different frequency), while the upper electrode assembly 32 provides a return path to ground, to generate a plasma from the process gas injected into the region of the plasma processing chamber 30 located between the upper electrode assembly 32 and the substrate 40 to etch the substrate 40. In other embodiments, the plasma processing chamber 30 can include one or more RF power sources to supply power to the upper electrode assembly 32 at one or more frequencies.

As also shown in FIG. 4, a temperature probe 10 is located inside of the substrate support 36 and is spaced from the top surface 38. The temperature probe 10 can have a construction as shown in any one of FIGS. 1-3, for example. The temperature probe 10 is adapted to measure the temperature of the uppermost region of the substrate support 36 adjacent the top surface 38 supporting the substrate 40, to allow the temperature of the substrate 40 to be determined.

Figure 5:
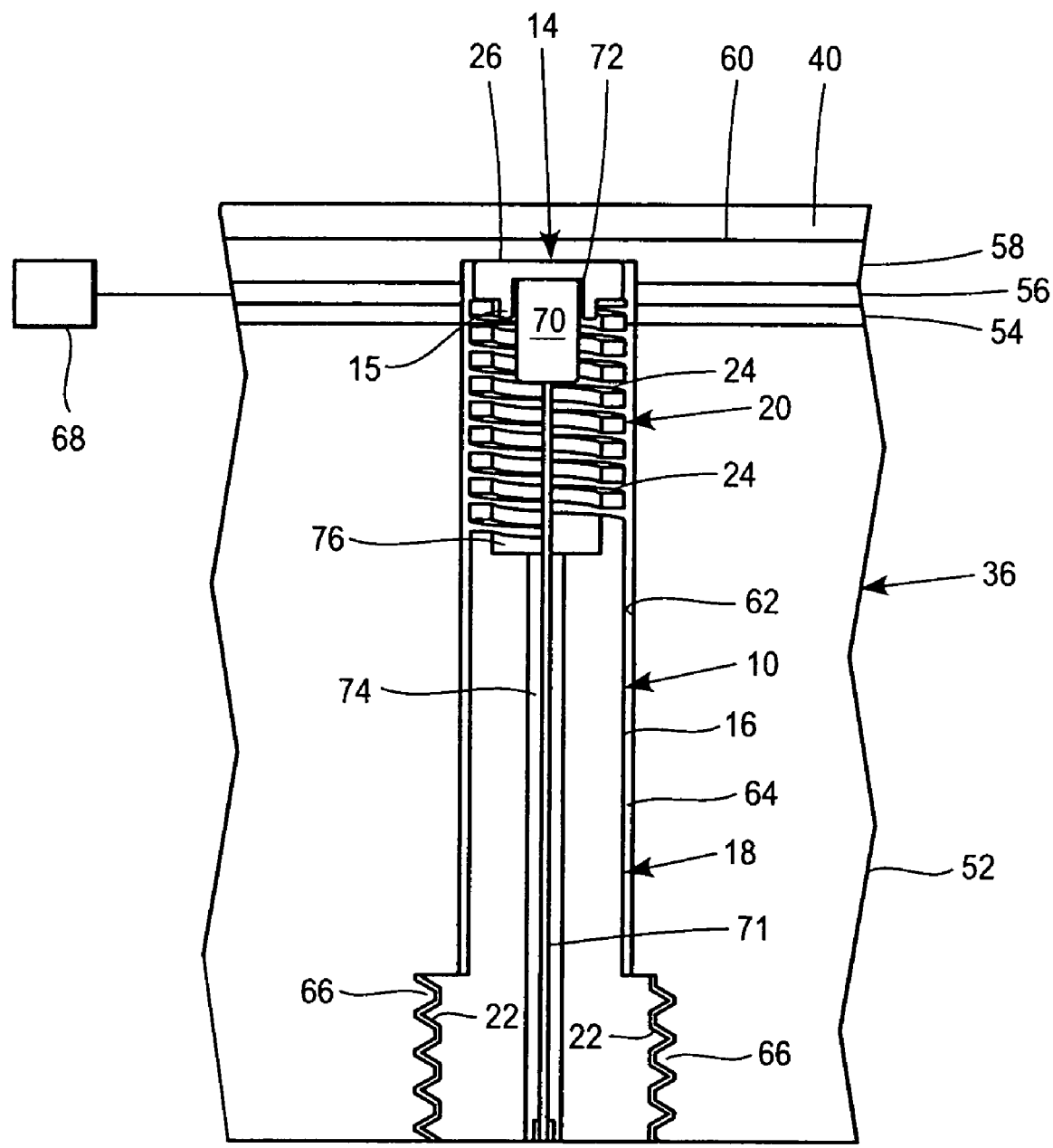
FIG. 5 illustrates an exemplary embodiment of a temperature probe including a contact sensor installed in a substrate support of a plasma chamber.

FIG. 5 depicts a temperature probe 10 installed in an exemplary embodiment of the substrate support 36. As shown in FIG. 5, the substrate support 36 includes a base 52, a bonding material forming a bonding layer 54 between the base 52 and a heater layer 56, and a target layer 58 on the heater layer 56. The semiconductor substrate 40, whose temperature is to be measured by the temperature probe 10, is supported on the top surface 60 of the target layer 58.

It is desirable to accurately measure temperatures inside of the plasma processing chamber 30 because temperature strongly influences the semiconductor processing performed in the processing chamber 30, and variations in temperature inside the processing chamber can cause processes to drift. The temperature of various components within the plasma processing chamber 30 affects the processing performed by the equipment. For example, during etching, the etch process should occur within a predetermined temperature range because when the temperature exceeds the predetermined temperature range, etching reactions are altered, thereby causing etch process drift.

In the embodiment shown in FIG. 5, the base 52 is comprised of a metallic material. The metallic material preferably has a high thermal conductivity. For example, the metallic material can be aluminum, an aluminum alloy, copper, a copper alloy, or the like. The substrate support 36 can include a temperature control system operable to control the temperature of the base 52. The base 52 can include liquid flow passages through which a temperature-controlled cooling liquid, such as water or the like, can be flowed from a temperature-controlled liquid source 44 (FIG. 4) in fluid communication with the flow passages to control the temperature of the base 52 to within the desired temperature range during processing of the semiconductor substrate 40 supported on the target layer 58. As shown, the base 52 includes an inner surface 62 defining a bore 64. The diameter of the bore 64 can be varied to vary the size of the gap between the outer surface 16 of the housing 12 above the threads 22 and the inner surface 62 of the base 52 defining the bore 64, to thereby affect the influence of the temperature of the base 52 on the housing 12 (i.e., the thermal resistance between the base 52 and the housing 12). The lower end of the base 52 includes internal threads 66 to engage the external threads 22 on the first portion 18 of the housing 12 to secure the temperature probe 10 in the bore 64.

During operation of the plasma processing chamber 30 to process semiconductor substrates supported on the substrate support 36, the base 52 is kept at a lower temperature than the target layer 58, which is heated by the heater layer 56, to allow heat to be transferred effectively by conduction from the target layer 58 to the base 52. The tip 14 and the housing 12 of the temperature probe 10 can typically be exposed to temperatures ranging from about −20° C. to about 90° C., with the maximum temperature difference between the target layer 58 and the base 52 typically being about 50° C. The temperature probe 10 is constructed to reduce, and preferably minimize, the effect of such a potentially large temperature difference between the target layer 58 and base 52 on the accuracy of temperature readings of the target layer 58 (and thus of the semiconductor substrate 40 supported on the target layer 58) made by the temperature probe 10.

The rate of heat transfer into and out of the tip 14 affects the temperature of the tip 14. Accordingly, it is desirable that even large temperature differences between the target layer 58 and base 52 have only a minimal effect on heat transfer into and out of the tip 14 so that the large temperature differences do not negatively affect the accuracy of temperature readings of the target layer 58 by the temperature probe 10, which would cause the temperature probe 10 to read a temperature that is different from the actual temperature of the target layer 58. By thermally isolating the tip 14 from the first portion 18 of the housing 12, whose temperature is strongly affected by cooling the base 52, the effect of the temperature difference between the target layer 58 and the base 52 on the accuracy of temperature readings of the target layer 58 made by the temperature probe 10 is reduced and preferably eliminated.

In the embodiment, a controlled amount of power is supplied to the heater layer 56 by a power supply 68 to maintain the temperature of the overlying target layer 58 within a desired temperature range. The bonding layer 54 produces thermal resistance between the heater layer 56 and the base 52, so that heat generated by the heater layer 56 is transferred efficiently into the target layer 58. For simplicity, the exemplary target layer 58 is depicted as being a single layer. The single layer can comprise, for example, a ceramic material, such as alumina, yttria, zirconia, quartz, combinations thereof, or the like. In some embodiments, the target layer 58 can comprise more than one layer. For example, the target layer 58 can be an electrostatic chuck assembly. In such embodiments, the target layer 58 can comprise a ceramic material layer and one or more additional layers, for example. The target layer 58 and the metallic base 52 have significantly different coefficients of thermal expansion and are also subjected to respectively different temperature variations during operation. Consequently, the base 52 and the target layer 58 also undergo different amounts of thermal expansion during this operation. The bonding layer 54 is made of a material that is sufficiently compliant to accommodate this potentially large thermal expansion difference between the target layer 58 and base 52 without debonding or negatively affecting the flatness of the substrate support. The bonding material can be any suitable material that provides the desired bonding strength, thermal resistance and compliancy, such as silicone bonding compounds, or the like.

In another embodiment, the target layer 58 can be located directly on the bonding layer 54 (i.e., the substrate support does not include the intermediate heater layer), and the temperature of the target layer 58 can be controlled by varying the temperature (and optionally also the liquid, liquid flow rate and/or duration of flow) of the temperature-controlled liquid supplied to flow passages in the base 52 from the source 44 to maintain the target layer 58 at the desired temperature.

In the exemplary embodiment shown in FIG. 5, the temperature probe 10 includes a "contact" sensor 70. That is, the sensor 70 is in direct physical contact with the tip 14. The tip 14 includes a bottom surface 72 whose temperature is measured by the sensor 70. As shown, a portion of the sensor 70 can be seated in the bottom surface 72 of the tip 14, in direct thermal contact with the tip 14. The sensor 70 includes wiring 71 extending through a longitudinal bore of the housing 12. The longitudinal bore includes a first section 74 in the first portion 18 of the housing and a second section 76 in the second portion 20 of the housing 12. The diameter of the second section 76 of the longitudinal bore is larger than the diameter of the first section 74 of the longitudinal bore due to the wall thickness of the housing 12 being smaller at the second portion 20 than at the first portion 18. The tip 14 can be comprised of any material having a sufficiently high thermal conductivity to reduce thermal resistance between the target layer 58 and the tip 14. For example, the tip 14 can be comprised of metals including copper, copper alloys, aluminum, aluminum alloys, platinum or the like, or from high-conductivity, non-metallic materials, such as aluminum nitride and the like.

As shown in FIG. 5, the tip 14 is configured to be secured to an open upper end of the housing 12. The tip 14 includes an annular ring 15 configured to be received inside the housing 12 to friction fit the tip 14 to the housing 12. Alternatively, the tip 14 can include external threads for engaging mating internal threads formed on the inner surface of the housing 12 adjacent the upper end. In other embodiments, the tip 14 can be bonded to the housing 12 with a bonding material having low thermal conductivity, which can reduce heat conduction from the tip 14 to the second portion 20 of the housing 12. As described above, the second portion 20 of the housing 12 resiliently biases the tip 14 so that the surface 26 of the tip 14 makes good thermal contact with the target layer 58 to ensure low thermal resistance and good heat transfer from the target layer 58 into the tip 14.

The contact sensor 70 can be a thermocouple, thermistor, resistance temperature detector (RTD), platinum resistance bulb, bulk silicon device, or active sold state device, for example. A potting material can be placed in the first section 74 of the longitudinal bore of the housing 12 to fill the space surrounding the sensor 70. Temperature readings of the target layer 58 by the contact sensor are used to estimate the temperature of the semiconductor substrate 40 supported on the surface 60 of the target layer 58.

Figure 6:
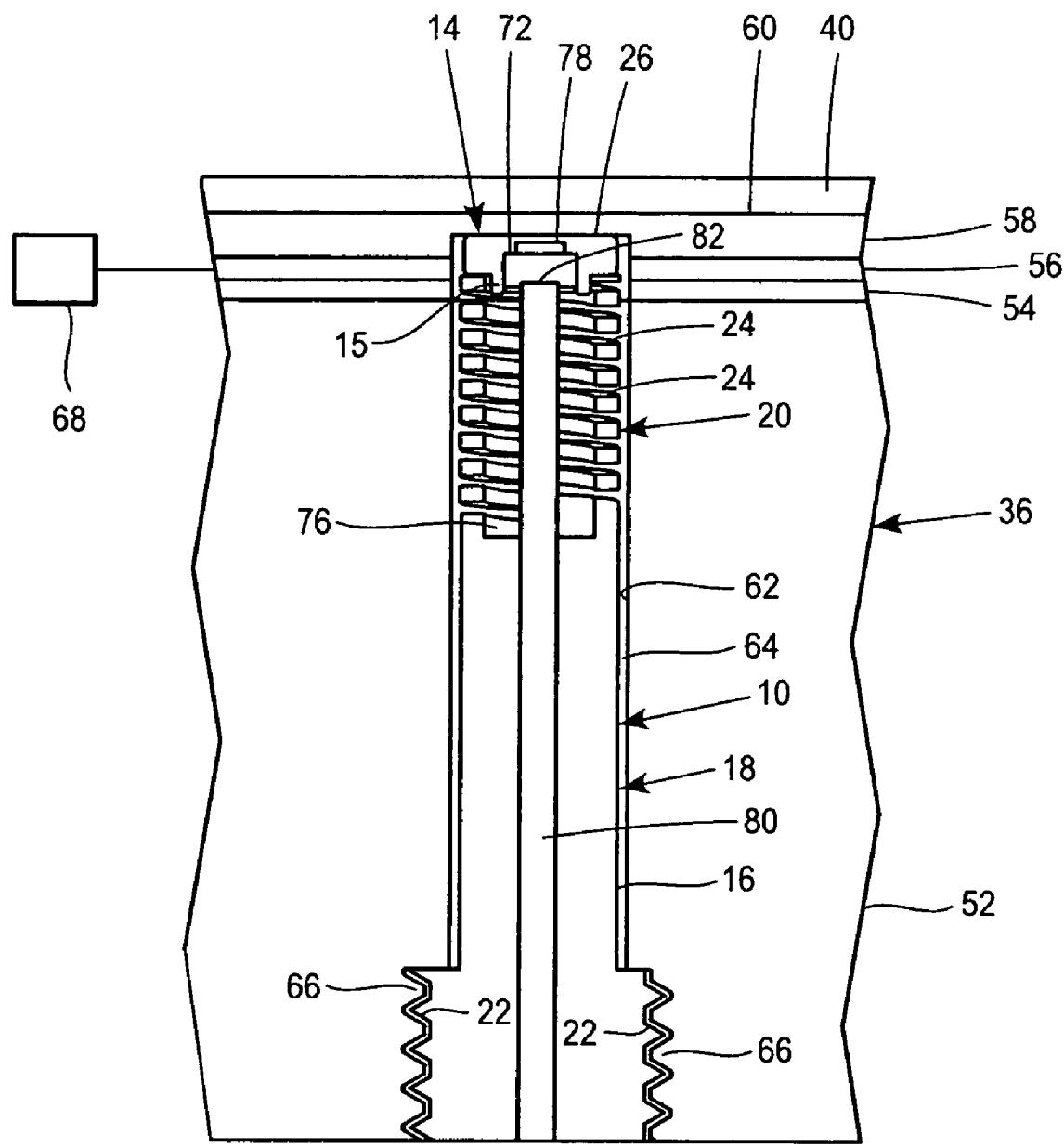
FIG. 6 illustrates an exemplary embodiment of a temperature probe including a non-contact sensor installed in a substrate support of a plasma processing chamber.

FIG. 6 depicts a temperature probe 10 according to another exemplary embodiment installed in an exemplary embodiment of the substrate support 36. In this embodiment, the temperature probe 10 includes a "non-contact" sensor, i.e., a sensor that measures the temperature of the target layer 58 without contacting the tip 14 of the housing. The non-contact sensor measures the temperature of the target layer 58 by a radiation pyrometry technique by monitoring the quantity and character of light emitted by a luminescent material positioned in thermal communication with the target layer 58.

In the illustrated embodiment, the sensor includes an optical waveguide 80, located in the longitudinal bore of the housing 12 for transmitting light emitted from a light source. The optical waveguide can be, for example an optical fiber. The optical waveguide 80 can be comprised of any suitable material for transmitting light through the housing 12. For example, the optical waveguide 80 can be made from plastic, quartz, sapphire, or the like. As shown in FIG. 4, a light source 46 is located outside of the plasma processing chamber 30. The light source 46 can be any suitable device that emits at a desired wavelength or wavelength range. For example, the light source 46 can be a laser. A luminescent material 78 is located on the bottom surface 72 of the tip 14. As shown, the end 82 of the optical waveguide 80 at which light is emitted is spaced from the luminescent material 78. The optical waveguide 80 typically extends perpendicular to the bottom surface of the luminescent material 78, as shown. In an embodiment, the luminescent material 78 is a phosphor. Phosphors are transition metal compounds or rare earth compounds. Phosphors typically comprise a host material and an added activator to affect the emission time. The phosphor can be selected based on the temperature range that the target layer 58 is exposed to in the plasma processing chamber 30. The phosphor can be contained in a binder, such as a silicate resin binder. A light-transparent material (for example, quartz) can cover the phosphor so that the phosphor is not exposed to the environment.

In this embodiment, the phosphor is irradiated in pulses by light emitted by the light source 46 and transmitted by the optical waveguide 80. When the phosphor is excited by this light, the phosphor emits light at a different wavelength than the light emitted by the light source 46. The light emitted by the phosphor can be in the visible or non-visible region of the electromagnetic spectrum to allow detection of the emitted light with standard light detectors. This light can be transmitted by glass and quartz optical waveguides, for example. The rate of decay of the light emitted by the phosphor after termination of the pulses emitted by the light source 46 is a function of the temperature of the phosphor.

The rate of the decay of the light emitted by the phosphor is monitored, quantified and compared to known temperature values for the phosphor. A light processing system is operatively associated with the optical waveguide 80 to process the light emitted by the phosphor and transmitted by the optical waveguide to determine the phosphor temperature. The phosphor temperature corresponds to the temperature of the tip 14. As shown in FIG. 4, the light processing system can comprise a photodetector 48 located outside of the chamber 30 to detect light emitted by the luminescent material and carried by the optical waveguide 80. The photodetector 48 outputs an electrical signal to a signal processing system 50 of the light processing system. The signal processing system processes the electrical signal to convert the signal to a temperature value for the target layer 58 in thermal contact with the tip 14 of the temperature probe 10. This temperature value is used to estimate the temperature of the semiconductor substrate 40 supported on the target layer 58. The temperature value can be used to control the amount of power supplied to the heater layer 56 of the substrate support 36 to control the temperature of the target layer 58.

In another embodiment of the temperature probe 10, the luminescent material 78 provided on the tip 14 is a blackbody material. The blackbody material emits infrared (IR) light based on the temperature of the luminescent material. The wavelength of the IR light emitted by the blackbody material is measured by a suitable light processing system and the temperature of the target layer 58 can be inferred from the measured wavelength.

While the invention has been described in detail with reference to specific embodiments thereof, it will be apparent to those skilled in the art that various changes and modifications can be made, and equivalents employed, without departing from the scope of the appended claims.

What is claimed is:

1. A temperature probe for measuring the temperature of an object, comprising:
   a housing comprising first and second portions comprised of the same material, and a bore including a first section extending through the first portion and a second section extending through the second portion, the second portion of the housing comprising a first end adjacent the first portion, a second end, a wall including an outer surface and an inner surface defining the second section, and at least one opening extending through the wall;
   a tip mounted to the second end of the second portion, with the tip adapted to contact a surface of the object whose temperature is to be measured; and
   a sensor located in the bore and adapted to measure a temperature of the tip;
   wherein the second portion has a thermal resistance effective to thermally isolate the tip from the first portion.

2. The temperature probe of claim 1, wherein the sensor is in physical contact with the tip.

3. The temperature probe of claim 1, wherein:
   the second portion of the housing has a length from the first end to the second end;
   the at least one opening is configured such that heat is conducted between the first end and second end in a turning pattern having a length exceeding the length of the second portion, and each opening has a width of about 0.1 mm to about 0.5 mm;
   the material of the second portion defining the respective one or more openings has a width of about 0.3 mm to about 2.5 mm;

the wall of the second portion has a thickness of about 0.5 mm to about 2 mm; and the second portion of the housing resiliently biases the tip.

4. The temperature probe of claim 1; wherein the entire housing is comprised of a polymeric material.

5. The temperature probe of claim 1, wherein the entire housing is comprised of a metal.

6. The temperature probe of claim 1, wherein:

the first section of the bore has a first diameter;

the second section of the bore has a second diameter larger than the first diameter; and the first portion of the housing includes a base with external threads.

7. The temperature probe of claim 1, wherein:

a luminescent material is provided on the tip; and the sensor comprises an optical waveguide located in the bore of the housing, the optical waveguide including an end spaced from and facing the luminescent material, the optical waveguide adapted to transmit light emitted by the luminescent material.

8. The temperature probe of claim 7, wherein:

the luminescent material is a phosphor;

a light source is arranged to emit light into the optical waveguide to irradiate the phosphor and cause the phosphor to emit light; and a light processing system is arranged to process the light emitted by the phosphor and transmitted by the optical waveguide to determine a temperature of the phosphor which corresponds to a temperature of the tip.

9. The temperature probe of claim 7, wherein:

the luminescent material is a blackbody material; and a light processing system is arranged to process the light emitted by the blackbody material and transmitted by the optical waveguide to determine a temperature of the blackbody material which corresponds to a temperature of the tip.

10. A substrate support for supporting a semiconductor substrate in a plasma processing chamber, the substrate support comprising:

a metallic base including a bore;

a heater layer on the base;

a target layer on the heater layer, the target layer including a first surface adapted to support the semiconductor substrate and a second surface; and a temperature probe according to claim 1 located in the bore of the base with the tip in contact with the second surface of the target layer, the temperature probe adapted to determine the temperature of the target layer.

11. The substrate support of claim 10, wherein the sensor is in physical contact with the tip.

12. The substrate support of claim 10, wherein:

a luminescent material is provided on the tip;

the sensor comprises an optical waveguide located in the bore of the housing, the optical waveguide includes an end spaced from and facing the luminescent material, the optical waveguide adapted to transmit light emitted by the luminescent material;

a light source is arranged to emit light which is transmitted by the optical waveguide and irradiates the luminescent material to cause the luminescent material to emit light which is transmitted by the optical waveguide; and a light processing system is arranged to process the light emitted by the luminescent material and transmitted by the optical waveguide to determine a temperature of the luminescent material which corresponds to a temperature of the tip.

13. The substrate support of claim 10, wherein:

the entire housing is comprised of a polymeric material;

the wall of the second portion has a thickness of about 0.5 mm to about 2 mm;

the at least one opening is configured such that heat is conducted between the first end and second end of the second portion in a turning pattern having a length exceeding the length of the second portion, and each opening has a width of about 0.1 mm to about 0.5 mm;

the material of the second portion defining the respective one or more openings has a width of about 0.3 mm to about 2.5 mm; and the second portion of the housing resiliently biases the tip against the second surface of the target layer in a self-aligning manner.

14. The substrate support of claim 10, wherein:

the base is adapted to be in fluid communication with a source of temperature controlled liquid for controlling the temperature of the base;

the first portion of the housing includes a base with external threads; and the base includes internal threads which engage the external threads of the base of the housing.

15. A temperature probe for measuring the temperature of an object, comprising:

a housing comprising a first portion, a second portion, and a bore including a first section extending through the first portion and a second section extending through the second portion, the entire housing being comprised of the same material, the first section of the bore having a larger diameter than the second section, the second portion of the housing comprising a first end adjacent the first portion, a second end, a wall including an outer surface and an inner surface defining the second section, and at least one opening extending through the wall and configured such that heat is conducted between the first and second ends of the second portion in a turning pattern having a length exceeding the length of the second portion;

a tip mounted to the second end of the second portion, the tip adapted to contact a surface of the object whose temperature is to be measured; and a sensor located in the bore and adapted to measure a temperature of the tip;

wherein the second portion (i) has a thermal resistance effective to thermally isolate the tip from the first portion and (ii) resiliently biases the tip.

16. The temperature probe of claim 15, wherein the sensor is in physical contact with the tip.

17. The temperature probe of claim 15, wherein:

a luminescent material is provided on the tip;

the sensor comprises an optical waveguide located in the bore of the housing, the optical waveguide including an end spaced from and facing the luminescent material, the optical waveguide adapted to transmit light emitted by the luminescent material;

a light source is arranged to emit light into the optical waveguide to irradiate the luminescent material and cause the luminescent material to emit light; and a light processing system is arranged to process light emitted by the luminescent material and transmitted by the optical waveguide to determine a temperature of the luminescent material which corresponds to the temperature of the tip.

18. The temperature probe of claim 15, wherein:
the second portion of the housing has a length from the first end to the second end;
each opening has a width of about 0.1 mm to about 0.5 mm;
the material of the second portion defining the respective one or more openings has a width of about 0.3 mm to about 2.5 mm; and
the wall of the second portion of the housing has a thickness of about 0.5 mm to about 2 mm.

19. A substrate support for supporting a semiconductor substrate in a plasma processing chamber, the substrate support comprising:
a base including a bore;
a heater layer on the base;
a target layer on the heater layer, the target layer including a first surface adapted to support the semiconductor substrate and a second surface; and
a temperature probe according to claim 15 located in the bore of the base with the tip in contact with the second surface of the target layer, the temperature probe adapted to determine the temperature of the target layer.

20. A temperature probe for measuring the temperature of an object, comprising:
a one-piece housing comprising first and second portions and a longitudinal bore extending through the first portion and the second portion, the second portion of the housing comprising a first end adjacent the first portion, a second end, a wall including an outer surface and an inner surface defining a portion of the longitudinal bore, and at least one opening extending through the wall and configured such that heat is conducted between the first and second ends of the second portion in a turning pattern having a length exceeding the length of the second portion;
a tip mounted to the second end of the second portion, with the tip adapted to contact a surface of the object whose temperature is to be measured, wherein the second portion is effective to resiliently bias the tip against the surface; and
a sensor located in the bore and adapted to measure a temperature of the tip.

* * * * *